Dec. 19, 1967  J. P. HUSBJERG  3,358,426
PREHEATING APPARATUS FOR CEMENT RAW MEAL
Filed March 16, 1966  2 Sheets-Sheet 1
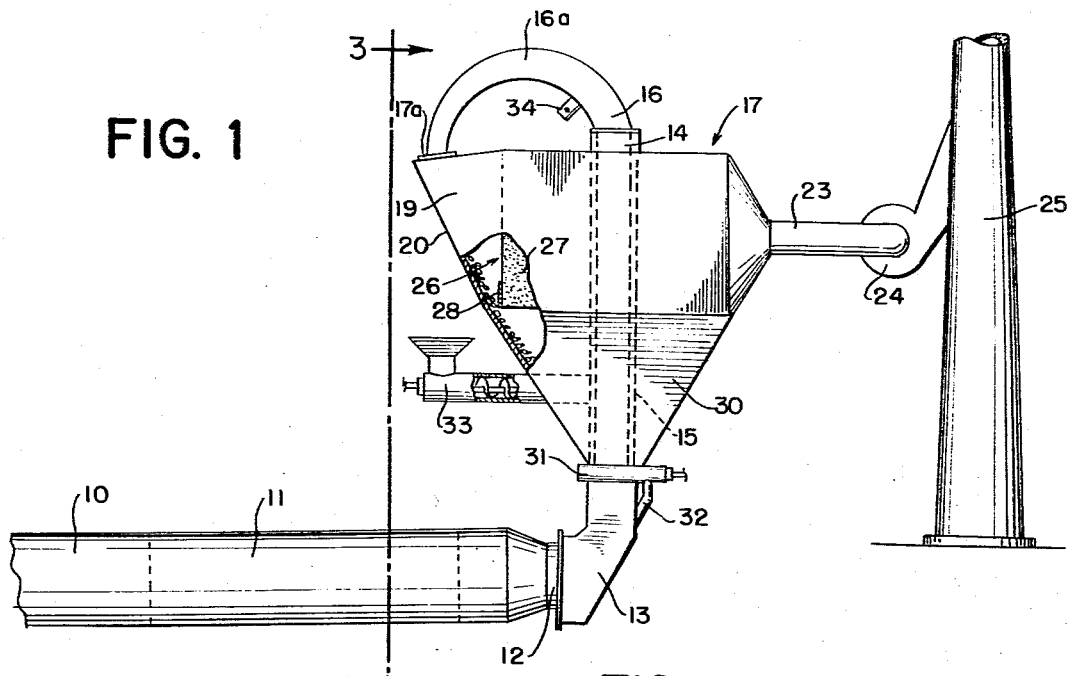
FIG. 1
FIG. 2
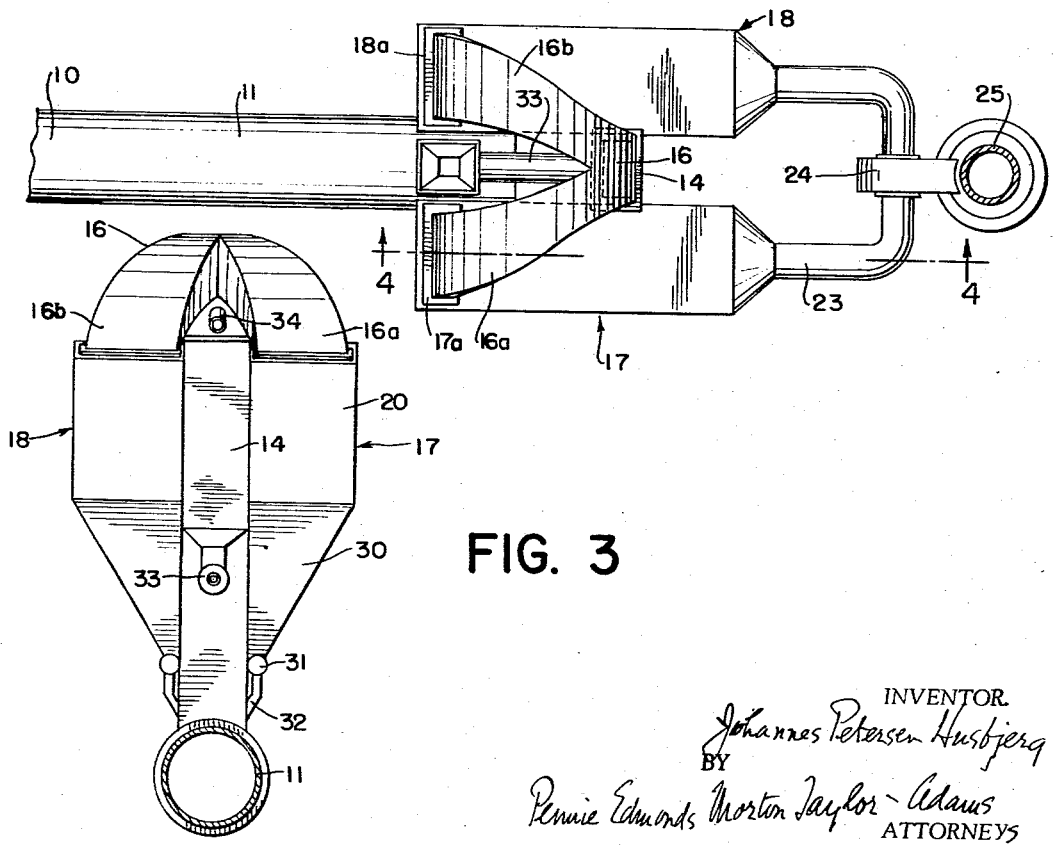
FIG. 3
INVENTOR.
Johannes Petersen Husbjerg
BY
Pennie Edmonds Morton Taylor ~ Adams
ATTORNEYS Dec. 19, 1967  J. P. HUSBJERG  3,358,426
PREHEATING APPARATUS FOR CEMENT RAW MEAL
Filed March 16, 1966  2 Sheets-Sheet 2

INVENTOR.
Johannes Petersen Husbjerg
BY
Pennie Edmonds Morton Taylor Adams
ATTORNEYS United States Patent Office 3,358,426
Patented Dec. 19, 1967

3,358,426
PREHEATING APPARATUS FOR CEMENT
RAW MEAL
Johannes Petersen Husbjerg, Copenhagen-Valby, Denmark, assignor to F. L. Smidth & Co., New York, N.Y., a corporation of Delaware
Filed Mar. 16, 1966, Ser. 542,985
3 Claims. (Cl. 55—267)

This is a continuation-in-part of my application, Ser. No. 287,315 filed June 12, 1963, now abandoned.

This invention relates to preheaters for transferring heat between rotary kiln waste gases and raw meal to be subsequently burnt to cement clinker in the rotary kiln and for separating the heated raw meal from the gas after heat transfer. More particularly it relates to preheater apparatus of the kind described, wherein raw meal is introduced into a stream of waste gases flowing upwardly in a riser pipe from a rotary kiln and includes novel apparatus for separating the heated raw meal from the gas and comprising a separator for removing coarse particles of raw meal from the gas, a dust collector for removing fine particles of raw meal and a collecting chamber receiving separated particles of raw meal from both the separator and the collector. The new preheater is of simpler construction, occupies less space, and requires less head room than prior comparable preheaters and may thus be employed in installations where space and head room limitations prevent the use of prior preheaters.

Preheaters are used heretofore in cement plants for preheating the kiln feed of particles of cement raw meal by hot gas from the kiln have included various forms of apparatus for separating the particles of raw meal from the gas after the heat exchange has taken place. In a typical installation, the gas with the heated particles in suspension therein first passes through a cyclone, in which the coarse particles are separated from the gas, and then through a dust collector, in which the fine particles are separated from the gas and which may, for example, be an electrostatic precipitator. In practice it is usual to use two cyclones ahead of the electrostatic precipitator and such a separating apparatus occupies a large amount of space and is of substantial height.

In a preheater constructed in accordance with the invention, a riser pipe receiving hot gas from the kiln is connected at its upper end through a separator to a dust collector. In the separator, coarse particles are removed from the gas stream and a direct connection is provided between the separator and a collecting chamber. The dust collector separates the fine particles from the stream and discharges directly into the collecting chamber so that the same collecting chamber is employed for both the separator and the dust collector. The separator takes the place of one or more cyclones and with only a single collecting chamber required, the separating apparatus is more compact and occupies less space and head room than previous exchangers.

In the separator of the new exchanger, the coarse particles are separated from the gas stream by centrifugal force, and for this purpose, the separator includes a pipe curved through about 180° for receiving gas with particles entrained therein from the top of the riser pipe and reversing the direction of gas flow from upward to downward and conducting the gas into the upper part of a separating chamber. The separating chamber lies above and is directly connected to the collecting chamber and, as the gas stream passes through the curved pipe, centrifugal force acting upon the coarse particles causes them to move outwardly away from the center of curvature of the pipe. Upon entering the separating chamber, the particles land upon a wall thereof and pass directly through the separating chamber into the collecting chamber. The use of the curved pipe offers a further advantage in that it makes it possible to dispose the separating chamber and the dust collector below the level of the upper end of the riser pipe and thus reduce the height of the separating apparatus.

It is advantageous to provide a single casing having a hopper bottom which serves as a collecting chamber and to connect the curved pipe to an inlet opening in the top of the casing near a sloping wall thereof. The dust collecting means may then be mounted in the casing above the hopper bottom and at one side of the connection to the curved pipe. A gas outlet opening for the cleaned gas is provided in a side of the casing opposite to the sloping wall end, a fan is employed to draw gas from the casing through the dust collecting means and, with the arrangement described, the coarse particles thrown to one side of the stream in the curved pipe and those dropping out of the stream flowing through the casing to the dust collecting means slide down the sloping wall into the collecting chamber. When the dust collecting means is an electrostatic precipitator, the plates of the precipitator attract the fine particles from the gas and are vibrated periodically to drop the particles into the collecting chamber. The particles are removed from the collecting chamber and introduced into the kiln through the end through which the gas leaves the kiln.

The exchanger may be dual and include a pair of separating apparatus units, each unit comprising a separator, a dust collector, and a collecting chamber. With this arrangement, the units may lie on opposite sides of the riser pipe and the curved pipe is formed with two branches, each leading from the riser pipe to the separator of one of the units.

For a better understanding of the invention, reference may be made to the accompanying drawings, in which FIG. 1 is a view in side elevation with parts broken away of a heat exchanger constructed in accordance with the invention and used with a rotary kiln;

FIG. 2 is a plan view of the installation shown in FIG. 1;

FIG. 3 is a sectional view on the line 3—3 of FIG. 1;

Figure 4:
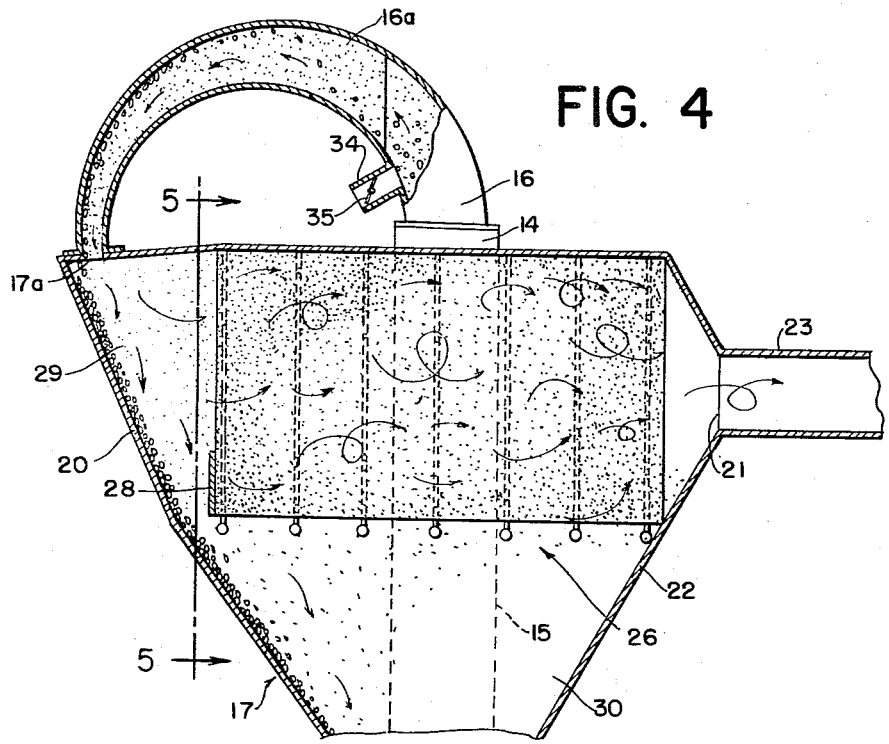
FIG. 4 is a sectional view on the line 4—4 of FIG. 2.
Figure 5:
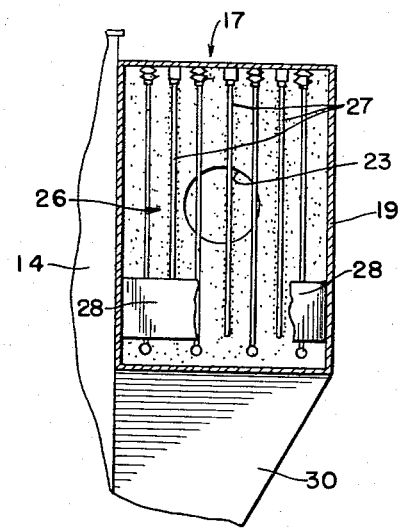
FIG. 5 is a sectional view on the line 5—5 of FIG. 4.

The installation illustrated in the drawings includes a rotary kiln 10 which contains a built-in heat exchanger section 11 of conventional construction. The gas outlet end 12 of the kiln enters a stationary adapter 13 in the form of a vertical elbow, to the upper end of which is connected a riser pipe 14 which is rectangular in section and lined with brick, as indicated at 15. At its upper end, the riser pipe is connected to a curved pipe 16, which is formed with branches 16a, 16b. The branches of the pipe are curved through 180° and lead to inlets 17a, 18a of the respective separating units 17 and 18. As these units are of identical construction, only one will be described.

The unit 17 comprises a casing 19 which is generally of hopper shape with its inlet 17a lying above a sloping end wall 20. A gas outlet opening 21 is formed in the opposite sloping wall 22 and a pipe 23 leads from the opening 21 to the intake of a fan 24 discharging into a chimney 25. A dust collector, generally designated 26, is mounted in the casing 19 near its top and between the inlet opening 17a and the outlet opening 21. In the installation illustrated, the dust collector is an electrostatic precipitator which includes a plurality of plates 27 lying parallel to the direction of gas flow from the inlet 17a to the outlet 21 and extending downwardly from the top of the casing 19. The lower left-hand corners of the plates, as shown in FIG. 4, lie spaced from the wall 20 to provide a clearance and a plate 28 connects the lower portions of the edges of the plates 27 extending upward from those corners.

The space of wedge-shaped section, which lies between the wall 20 and the adjacent edges of the plates 27, forms a separating chamber 29 connected through the clearance beneath the plate 28 to the bottom section of the casing which forms a collecting chamber 30. The chamber 30 receives particles separated from the gas in the separating chamber as well as particles separated from the gas in the dust collector 26.

The collecting chamber 30 at the bottom of each of the casings 17, 18 discharges into a screw conveyor 31 from the outer end of which a pipe 32 leads into the elbow 13. The screw conveyors are of conventional construction and driven by any suitable means.

The cement raw meal is introduced into the riser pipe by a screw feeder 33. The feeder is of conventional construction and driven by the usual means.

In the operation of the installation, the cement raw meal is fed into the riser pipe by the feeder 33 at the desired rate and the particles entrained in the gas stream travel upwardly through the pipe and enter the branches 16a, 16b of the pipe 16. In their travel through each curved branch pipe, coarse particles are thrown by centrifugal force against the outer wall of the pipe and, upon entering the separating chamber 29, to which the branch pipe leads, land on the sloping wall 20 and slide down into the collecting chamber 30. Other coarse particles are thrown from the gas as the stream changes direction in the separating chamber before it passes between the plates of the dust collector and leaves through the pipe 23.

It is to be noted that as the curved branches of the pipe 16 curve through its 180° from the upper end of the vertical riser pipe to the inlet opening 11a in the top of the casing, it progressively changes in cross-sectional shape from a substantially square shape to a rectangular shape thereby increasing the width of the outer curved wall of the curved section so that it can accommodate a greater quantity of particles centrifugally thrown against the outer curved wall which will be discharged along substantially the entire width of the sloping wall. Thus, the particles will slide down the sloping wall under centrifugal force beyond the dust precipitator to the collecting chamber and the main stream of the gas drawn by the fan will be drawn laterally across the casing through the dust precipitator. It is further to be noted that the outer curved wall of the curved section of the pipe and the sloping wall surface 20 provide a substantially continuous slide for the centrifugally separated particles which slide is located on an opposite side of the fan so that once separated the centrifugally separated particles do not have to enter the main stream of the gas.

In the travel of the gas stream through the dust collector, the fine particles are separated therefrom and they are discharged through the bottom of the dust collector into the collecting chamber 30. When the dust collector is an electrostatic precipitator, the plates 27 are vibrated from time to time in the usual manner to free the particles therefrom. The particles collecting in the chambers 30 are removed therefrom by the conveyors 31 and pass through the pipes 32 into the elbow 13. From the elbow, the particles enter the kiln and pass first through the built-in heat exchanger section 11 and then into the main part of the kiln.

In the dual installation described, it is possible to shut down one of the separating apparatus units for servicing of the electrostatic precipitator and operate with the other unit functioning alone. When a single unit is thus used, overheating of the unit may be prevented by admitting atmospheric air through an inlet 34 controlled by a butterfly valve 35 into the branch of the curved pipe leading to the active unit.

I claim:
1. Preheating apparatus for transferring heat between gases and particles of cement raw meal and separating the heated particles of raw meal from the gas after heat transfer which comprises a casing having a top and bottom and containing within its walls a separating chamber, a collecting chamber and a dust collector, the separating chamber defined in part by a sloping wall along a first side portion of the casing wall and adjacent to the top of the casing, and inlet opening for the particle laden gas in the top of the casing adjacent the sloping wall, a gas outlet opening for the cleaned gas in a second side portion of the casing opposite to the sloping wall, a dust collector spaced from the sloping wall and positioned between the inlet opening and the outlet opening, the collecting chamber underlying the sloping wall and the dust collector for receiving heated raw meal particles therefrom, the collecting chamber having downwardly sloping convergent walls, a rotary kiln having a common end for discharging hot waste gases and for receiving heated raw meal from the collecting chamber for burning to cement clinker, a vertical riser pipe having a lower end portion connected to the outlet of said rotary kiln and extending substantially upright and continuously without interruption or substantial variation in cross-section to an upper end portion which extends vertically beyond the top of the casing, means at the lower end portion of the vertical pipe for introducing raw meal into the pipe for entrainment in the waste gases flowing upwardly through the pipe, the upper end portion of the pipe being curved through about 180° from an upward direction to a downward direction and in a general direction from a position adjacent the second side portion of the casing toward the sloping wall side portion of the casing where its upper end is connected to the inlet opening whereby coarse heated raw meal particles are thrown by centrifugal force against the outer wall of the curved pipe and land on the sloping wall and slide down beyond the dust collector into the collecting chamber, fan means connected to the gas outlet to draw the gas stream from the casing through the dust collecting means, and means for receiving particles from the bottom of the collecting chamber and feeding them into the end of the rotary kiln.

2. The heat exchanging apparatus according to claim 1 wherein the curved upper end of the vertical riser pipe has a rectangular cross section at the inlet into the top of the casing and thereby defines an outer curved wall surface of increased width to accommodate a greater quantity of centrifugally separated particles thereon.

3. The heat exchanging apparatus according to claim 1 which includes a second casing containing within its walls a separating chamber, a collecting chamber and a dust collector of the same construction as in the first casing, said casings positioned on opposite sides of the vertical riser pipe, a second curved end portion of the pipe of the same construction as the first curved end portion leading from the vertical pipe to the second casing.

References Cited
UNITED STATES PATENTS

| | | | |
|---|---|---|---|
| 5,422 | 2/1848 | Lafitte. | |
| 795,412 | 7/1905 | Olson | 55—434 X |
| 1,024,784 | 4/1912 | Johnson. | |
| 1,239,456 | 9/1917 | Brantingham et al. | 55—459 X |
| 1,774,604 | 9/1930 | Lawrence | 55—126 X |
| 2,044,915 | 6/1936 | Mosley | 55—461 X |
| 2,221,385 | 11/1940 | Rogers | 55—461 X |
| 2,234,826 | 3/1941 | Koppers | 55—459 X |
| 2,265,707 | 12/1941 | Wall | 55—459 X |
| 2,663,561 | 12/1953 | Muller. | |
| 2,723,842 | 11/1955 | Hall. | |
| 2,767,840 | 10/1956 | Dobson et al. | 55—459 X |

(Other references on following page)

UNITED STATES PATENTS

| | | |
|---|---|---|
| 2,786,547 | 3/1957 | McCartney _____ 55—461 X |
| 2,866,625 | 12/1958 | Sylvest _____ 165—104 X |
| 2,917,344 | 12/1959 | Futty. |
| 2,994,666 | 8/1961 | Hinds. |
| 3,146,998 | 9/1964 | Golucke et al. |
| 3,162,431 | 12/1964 | Muller et al. |
| 3,173,980 | 3/1965 | Hysinger. |

FOREIGN PATENTS

| | | |
|---|---|---|
| 228,915 | 6/1960 | Australia. |
| 620,626 | 5/1961 | Canada. |
| 730,960 | 5/1932 | France. |
| 1,032,511 | 3/1953 | France. |
| 1,146,874 | 5/1957 | France. |
| 219,570 | 11/1923 | Great Britain. |
| 25,584 | 3/1915 | Norway. |

FRANK W. LUTTER, *Primary Examiner.*

HARRY B. THORNTON, *Examiner.*

D. TALBERT, *Assistant Examiner.*